United States Patent [19]

Bowman

[11] 4,422,571

[45] Dec. 27, 1983

[54] PROPORTIONAL MOTOR DRIVE CONTROL

[75] Inventor: William W. Bowman, Dallas, Tex.

[73] Assignee: Hoffman Controls Corp., Dallas, Tex.

[21] Appl. No.: 266,461

[22] Filed: May 22, 1981

[51] Int. Cl.³ .......................... F24F 7/00; F25D 17/04
[52] U.S. Cl. ......................................... 236/49; 62/186; 236/78 C
[58] Field of Search ................. 236/49, 78 C; 62/186, 62/180; 165/16

[56] References Cited

U.S. PATENT DOCUMENTS

| 3,941,310 | 3/1976 | Travaglio et al. | 236/49 |
| 4,042,173 | 8/1977 | Boyer et al. | 236/49 |
| 4,284,237 | 8/1981 | Harris et al. | 236/49 |

Primary Examiner—William E. Wayner
Attorney, Agent, or Firm—Kenneth R. Glaser

[57] ABSTRACT

An air conditioning control system has inputs for room temperature and air velocity voltage signals. Both signals are scaled and compared to determine which signal is larger, and the magnitude of the difference. The control circuit drives a variable speed damper motor in a direction determined by the greater of the two scaled input signals. The motor is driven at a rate proportional to the magnitude of the difference between the two signals. Means for setting the maximum and minimum open damper positions are provided within the control circuit.

7 Claims, 8 Drawing Figures

PROPORTIONAL MOTOR DRIVE CONTROL

BACKGROUND OF THE INVENTION

1. Field of the Invention

The present invention relates generally to air conditioning control systems and more specifically to a system for controlling the position of air conditioning dampers as a function of two sensed parameters.

2. Description of the Prior Art

Variable volume air conditioning systems provide for heating and cooling rooms, or zones of rooms, by adjusting the rate of flow into each room or zone. The temperature of the incoming air remains constant, with only the rate at which air moves into the zone being variable.

A number of devices for positioning dampers in ducts to control air flow have been developed. When the room temperature increases or decreases relative to the desired value, the movable dampers are opened or closed to adjust the volume of air flowing into the zone. The speed of the motor driving the dampers can be made variable to improve the response time of the system.

The accuracy of conventional systems is limited due to the substantial feed back delay between operation of the dampers and a change in room temperature. This causes the dampers to be overdriven. For example, if the room becomes too hot the dampers are opened to increase air flow and lower the temperature. When the room reaches the desired temperature, the dampers are closed back to their normal position. However, the temperature of the room will continue to fall for a short period of time. This causes the dampers to close further to warm the room. Usually, the room temperature will overshoot the desired setting several times before settling down. Such excursions of room temperature often define a damped oscillation.

A characteristic of present systems is that the room temperature variable gives rise to a certain damper position. However, various static pressures and flow rates in the system of a building cause the damper position to inaccurately indicate the volume of air flowing into the zone. That is, for a given damper position, the volume of air flowing into the zone can fluctuate over a wide range.

Present systems employing a variable speed damper motor are somewhat limited in that the motor speed is proportional to the difference between the room temperature and the desired temperature. Thus, if the room temperature suddenly changes, the dampers may be quickly driven fully opened or fully closed. This tends to magnify the oscillation effect discussed above.

Present variable volume control systems are characterized by limited accuracy and slow response time to bring the room back to the preselected temperature because the input signal consists of only one variable, that being the temperature of the room. The effect of having the only system feedback parameter increases these inaccuracies.

OBJECTS OF THE INVENTION

It is, therefore, the principal object of the present invention to provide a new and improved control system for variable volume air conditioning systems.

It is a further object of the present invention to provide a control system having inputs proportional to the room temperature and to the flow rate of conditioned air delivered to the room.

It is another object of the present invention to provide an air conditioning control system which will prevent oscillations in the room temperature after the room temperature deviates from the desired setting.

It is yet another object of the present invention to provide a new and improved variable speed motor drive control which drives the damper motor at a speed determined by the relationship between the room temperature and conditioned air velocity input signals.

SUMMARY OF THE INVENTION

A variable volume air conditioning system controls the temperature of a room, or of a zone composed of several rooms, by controlling the rate of flow of cooled or heated air flowing into the zone. The temperature of the air supplied by a central source to be used in a plurality of zones remains constant. Each zone has a control system to control the volume of air flowing into that zone.

The volume of air flowing into a particular zone is controlled by the use of variable position dampers. The position of the dampers can vary between fully closed, which prevents entry of conditioned air into the zone, and fully open, which causes air to flow into the zone at a maximum rate determined by the central blower fan.

The variable volume air conditioning system is suitable for both cooling and heating. Control of the volume of air entering a zone is conditioned upon the relationship between the air temperature in that zone and the volume of air moving into it. When cooling, a high zone temperature causes the air flow to be increased, and a low zone temperature decreases the air flow. When used in the heating mode, a high temperature in the zone causes the air flow to be decreased, and a low zone temperature increases the air flow. The preferred embodiment of the present invention provides that a polarity change in a voltage signal from a zone thermostat causes the system to switch between the cooling and heating modes.

According to the present invention, the air flow into each room or zone is controlled by a set of adjustable dampers driven by a damper motor. An air velocity sensor provides an input proportional to the volume of air flowing into the zone to a control circuit. A temperature sensor provides a second input to the control circuit.

The temperature and velocity signals are scaled and compared directly. The signal having the largest magnitude determines the direction in which the damper motor is driven. Control means are provided for driving the damper motor at a rate proportional to the difference in magnitude between the scaled temperature and velocity signals.

The novel features which characterize the present invention are defined by the appended claims. The foregoing and other objects and advantages of the invention will hereinafter appear, and for purposes of illustration, but not of limitation, a preferred embodiment is shown in the accompanying drawings.

DETAILED DESCRIPTION OF THE PREFERRED EMBODIMENT

Figure 1:
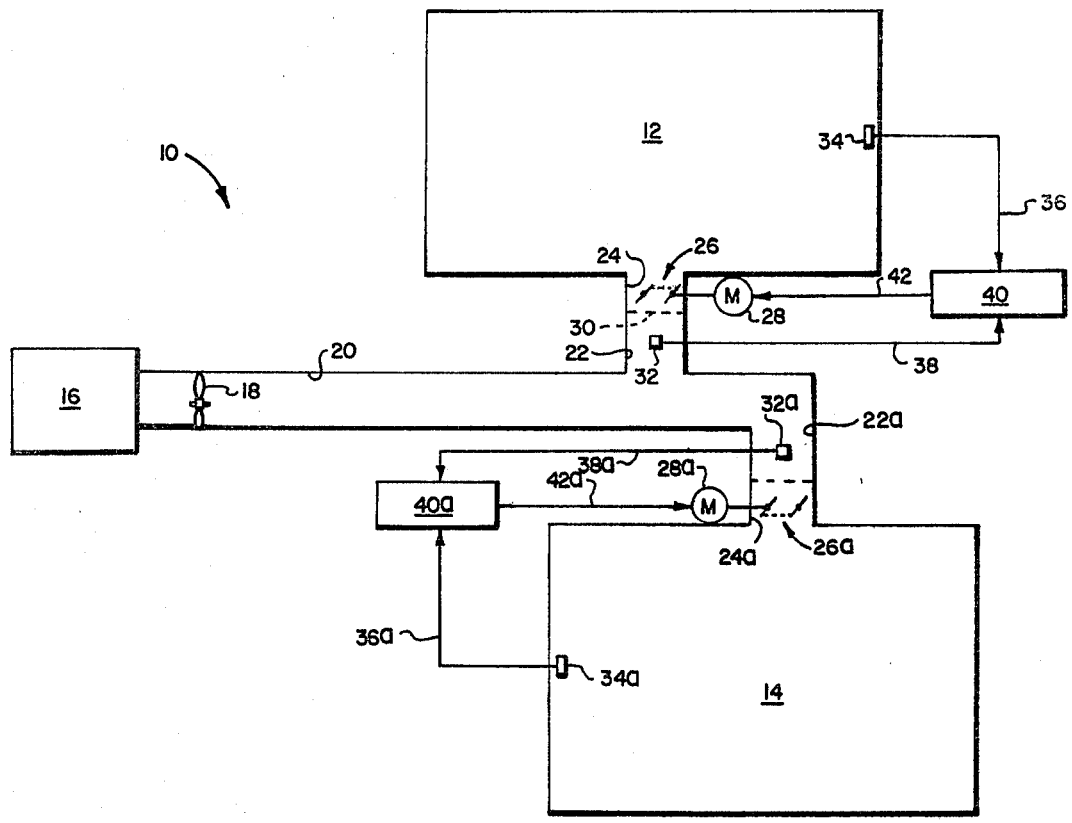
FIG. 1 is a block diagram of a variable volume air conditioning system.

Referring to FIG. 1, a year round air conditioning system is designated generally by the reference numeral 10. The system is shown supplying air to only two zones 12 and 14, but this number may be made as large as desired. Each zone is independently controlled.

A controlled temperature air supply 16 and a blower 18 represent the main air supply system. Air is supplied from the temperature control 16 at a constant temperature, being cold in the summer and hot during the winter. The blower 18 forces air through the system. The air is passed through one or a series of distribution ducts 20, and finally through one zone distribution duct 22, 22a, respectively, for each zone 12, 14.

FIG. 1 shows one air outlet 24, 24a into each zone 12, 14, respectively, for discussion purposes. However, each zone 12, 14 will typically have at least two entry points for the conditioned air.

The following discussion of the apparatus and operation of the variable volume system will be directed to the first zone 12. However, it is understood that the apparatus of the second zone 14 operates identically and devices located in the second zone will be referenced by the same numerals as their counterparts in the first zone 12, with the suffix "a" following the numeral.

A set of dampers 26 is located in the zone distribution duct 22 prior to the point where it divides to distribute air to the various parts of the zone 12. These dampers are rotated by the action of a damper motor 28. As shown in FIG. 1, when the dampers 26 are rotated clockwise, they restrict the flow of conditioned air into the zone 12. Rotating the dampers 26 counterclockwise opens the cross-section of the duct 22 and allows a greater volume of air to enter the zone 12. By controlling the position of the dampers 26, the volume of air flow into the zone 12 can be accurately controlled. The embodiment of FIG. 1 includes baffles 30 located downstream of the dampers 26 to minimize noise.

It is necessary to detect in some manner the volume of air flowing into the zone 12. Variations in back pressure due to dampers in different zones 12, 14 opening and closing can vary the volume of air entering the zone 12 for a given damper 26 position. In a duct 22 of constant size, the volume of air passing through the duct 22 and entering the zone 12 is proportional to the velocity of air through the duct 22. Therefore, a velocity sensor 32 is provided in the zone distribution duct 22 to monitor the volume of air flow.

The air temperature in the zone is detected by a thermostat 34. The thermostat 34 provides a voltage 36 proportional to the zone 12 temperature. In the explanation which follows, it will be assumed that the thermostat voltage 36 decreases with increasing temperature. When the thermostat functions in this manner, the control system 10 is operating in the cooling mode. To operate the system 10 in the heating mode, it is merely necessary to reverse the polarity of the thermostat voltage 36, which is preferably accomplished by a switch located on the thermostat 34. In that case, when an increase in room temperature provides for an increase in thermostat voltage, the control system 10 will be operating in the heating mode. In the following explanation, operation of the system 10 is discussed with reference to the cooling mode. System operation in the heating mode will generally become apparent from the following explanation, and specific differences will be indicated.

The room temperature as indicated by the thermostat voltage 36, and the volume of air flow as indicated by a velocity sensor voltage 38, each provide an input to a control circuit 40. The control circuit 40 controls the operation of the damper motor 28.

In the preferred embodiment, the damper motor 28 is a bi-directional, variable speed DC motor. This allows the control circuit 40 to control both the direction and speed of operation of the motor 28. In this embodiment, slight changes in room 12 temperature can be compensated for by slowly moving the damper motor 28. As the proper temperature is reached, the speed of the damper motor 28 decreases. This allows the dampers 26 to reach the correct position without overshooting, and thus, avoids oscillation in the position of the dampers 26. However, it is possible to provide that the control circuit 40 drives an AC motor, in which case the control circuit 40 would merely determine the direction of operation of the damper motor 28.

When the actual room temperature is equal to the desired room temperature, the damper motor 28 is not in operation. If the zone 12 becomes too hot, there is a decrease in the temperature signal voltage 36, which causes the control circuit 40 to open the dampers 26. This causes an increase in volume of cool air flowing into the room 12, which lowers the room temperature. If the temperature in the room 12 becomes too low, the control circuit 40 causes the damper motor 28 to drive the dampers 26 toward the closed position. This decreases the volume of air flowing into the zone 12, which results in a rise in the zone temperature.

It will become apparent to those skilled in the art that the preferred speed of the dampers 26 is relatively slow. This is, the damper motor 28 preferably drives the dampers 26 from the fully opened to the fully closed position in a matter of minutes rather than seconds. The air temperature in the zone 12 does not change quickly when the dampers 26 are open or shut.

Two zones 12, 14 are shown in FIG. 1. It will be seen that if it is necessary to completely shut the dampers 26 in the first zone 12, there will be a tendency toward greater air flow in the second zone 14. If zone 14 is already in equilibrium, this would tend to undesirably lower the temperature in that zone. However, the increased flow will be registered by the velocity sensor 32a of the second zone 14, which causes the control circuit 40a to close the dampers 26a. When the correct velocity is reached, the dampers 26a will cease movement. In this manner, the volume of air flowing into each zone is independent of air flow elsewhere in the system 10. It will be apparent that the same principle applies to systems having multiple zones as well as those having only two zones.

The control circuit 40 directly compares voltage signals 36, 38 from the velocity sensor 32 and the thermostat 34. This provides greatly increased accuracy and decreased response time as opposed to employing merely a thermostat 34 to provide the signal for driving a damper motor 28. The present control circuit 40 directly compares the velocity and temperature signals 36, 38 so that the dampers 26 are positioned to cause one correct velocity flow for a given room temperature. As the room temperature changes, the velocity flow, as controlled by the damper 26 position, will change with it. The actual air velocity is detected in the preferred embodiment, rather than merely approximating the velocity by detecting the position of the dampers 26.

One aspect of the preferred embodiment provides for driving the damper motor 28, and thus the dampers 26, at a rate proportional to the magnitude of the difference between the temperature signal 36 and the velocity signal 38. This is possible when a DC motor 28 is used to drive the dampers 26.

One aspect of the preferred embodiment provides for driving the damper motor 28, and thus the dampers 26, at a rate proportional to the magnitude of the difference between the temperature signal 36 and the velocity signal 38. When the difference between the control signals 36, 38 is large, the damper motor 28 is driven at a relatively high speed. When the difference is small, the damper motor 28 is driven at a relatively low speed. If the signals 36, 38 have the same value, the motor 28 is not operated.

For example, if the room temperature suddenly becomes too high, as might be caused by opening an outside door, the control circuit 40 applies a drive signal 42 to the motor 28 to open the dampers 26 to begin to open. As the voltage signal 38 from the velocity sensor 32 increases, the difference between the temperature signal 36 and the velocity signal 38 decreases. This causes the damper motor 28 to be driven at a slower rate. Eventually, the velocity signal 38 will increase to a point where there is no difference between the temperature signal 36 and the velocity signal 38, and the dampers 26 will cease to move. As the room 12 is cooled, the temperature signal 36 will drop back to its desired level. As the temperature signal 36 rises, the control circuit 40 will register an air velocity that is too large, and begin closing the dampers 26. Thus, as the room temperature decreases to the desired equilibrium level, the dampers 26 are slowly closed. Therefore, when the room 12 reaches the equlibrium level, the dampers 26 will already be in the correct position.

This is an improvement over a system which leaves the dampers open until the room reaches the desired temperature then closes them down. Due to the delay in changing the room temperature after changing the velocity flow, prior art methods cause the room temperature to drop too low and increase too high so that the room temperature defines a damped oscillation which eventually approaches the desired temperature. The present control circuit provides that the room temperature reaches the desired temperature as quickly as possible and remains there without oscillation.

Figure 2:
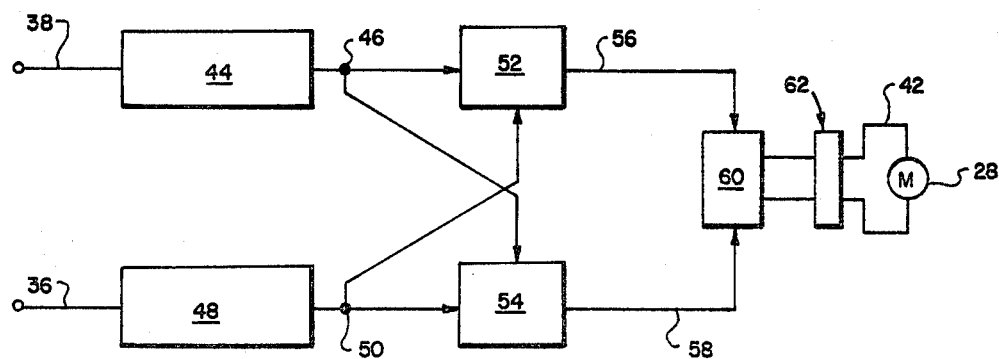
FIG. 2 is a block diagram of a control circuit for the air conditioning system of FIG. 1.

Referring to FIG. 2, a preferred embodiment of the control circuit 40 is shown. The velocity signal 38 is coupled to a velocity scaling circuit 44. The output 46 of the scaling circuit 44 has the opposite sign as the velocity signal 38, so that an increase in the air velocity causes a decrease in the velocity scaling circuit output 46. The velocity scaling circuit 44 also has an adjustable gain so that the scaled velocity signal 46 can be calibrated to the rest of the system.

The temperature signal 36 is coupled to a temperature scaling circuit 48, the output 50 of which has the same sign as that of the input. This is because the temperature signal 36 changes in the opposite direction relative to changes in the zone 12 temperature. The scaled velocity signal 46 and scaled temperature signal 50 are each coupled to an input to a first subtractor 52 and a second subtractor 54. In the first subtractor 52, the scaled temperature signal 50 is subtracted from the scaled velocity signal 46. In the second subtractor 54, the scaled velocity signal 46 is subtracted from the scaled temperature signal 50. It will be apparent that a first subtractor output 56 and a second subtractor output 58 will have the same magnitude and opposite signs. The first and second subtractor outputs 56, 58 are coupled to a positive mode switch 60. The switch 60 selects the subtractor signal 56, 58 having a positive sign.

The output from the positive mode switch 60 is coupled to a motor drive control 62. The drive control 62 selects the information transmitted by the switch 60, and drives the damper motor 28 in a direction determined by the selected signal 56, 58. The speed of the motor 28 is determined by the magnitude of the difference between the scaled velocity signal 46 and the scaled temperature signal 50.

When the scaled velocity and temperature signals 46, 50 are equal, the motor 28 will remain off. If the scaled velocity signal 46 decreases below the scaled temperature signal 50, indicating that the air flow into the zone 12 is too high for the present zone temperature, the drive control 62 will drive the motor 28 to close the dampers 26. If the scaled temperature signal 50 is lower than the scaled velocity signal 46, indicating that the temperature in the zone 12 is too high, the drive control 62 will operate the damper motor 28 to open the dampers 26 until the scaled velocity and temperature signals 46 and 50 become equal.

It is therefore apparent that a direct comparison of scaled velocity and temperature signals 46 and 50 provides damper 26 positions to properly control the volume of air entering the zone 12.

The preferred embodiments of FIGS. 3 through 8 utilize a common power supply (not shown). The supply used is preferably a 12 volt regulated supply. The 12 volt power supply voltage is referenced as Vo in all FIGURES.

Figure 3:
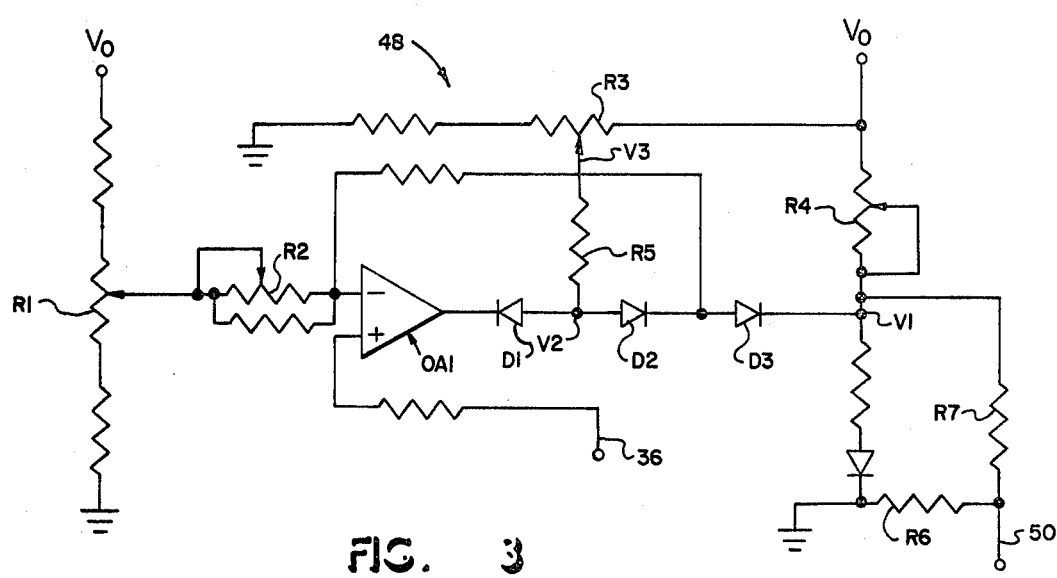
FIG. 3 is a schematic diagram of an amplifying circuit for a temperature signal.

A preferred embodiment for the temperature scaling circuit 48 is shown in FIG. 3. The temperature signal 36 of the theromstat 34 is connected to the positive input of an operational amplifier (OP AMP) OA1. First and second variable resistors R1 and R2 provide for calibration of the circuit, and are connected to the negative input of OA1.

The circuit shown in FIG. 3 includes a third variable resistor R3 for controlling the minimum damper open position and a fourth variable resistor R4 for controlling the maximum damper open position. These resistors R3, R4 are preferably adjustable by the system user, and allow the user to prevent the dampers 26 from reaching the fully closed or fully opened positions.

Diodes D1, D2 and D3 control the flow of current in the temperature scaling circuit 48. Voltage V1 at the cathode of diode D3 varies directly with the thermostat input voltage 36. Therefore, V1 decreases with increasing temperature when the system 10 is in the cooling mode.

Voltage V2 between the anodes of D1 and D2 varies with the thermostat voltage 36. The fixed voltage drop across D1 causes the output of OA1 and V2 to differ by the fixed forward bias voltage whenever the output of OA1 is less than a pick-off voltage V3. If the output of OA1 rises above V3, D1 becomes reverse biased, and V2 is equal to V3 minus the small voltage drop across pick-off resistor R5. V1 differs from V2 by the fixed drops across D2 and D3.

Through the operation described in the previous paragraph, it will be apparent to those skilled in the art that V1 rises and falls with the thermostat signal 36, but V1 will not rise above a value determined by the setting of variable resistor R3. Since a higher thermostat voltage 36 indicates a lower temperature, the variable resistor R3 sets the lowest temperature which the next stage of the control circuit 40 will read. Since a minimum velocity corresponds to a minimum temperature, adjustment of R3 sets the limit to which the dampers 26 will close. Adjusting R3 so that the pick-off voltage V3 is equal to the source voltage Vo allows the dampers 26 to be fully closed.

The variable resistor R4 operates to establish the maximum open damper 26 position. Setting variable resistor R4 establishes the minimum scaled temperature output voltage 50. Therefore, even though the temperature voltage signal 36 from the thermostat decreases, indicating increasing temperature, the scaled temperature output 50 will not decrease past a certain value, and will be read by the control circuit 40 as a constant temperature.

The voltage V1 will be that set by R4 unless V2 is greater than that value by at least the fixed voltage drops across D2 and D3. When V2 is high enough, V1 will track the variations due to a changing thermostat voltage 36.

Therefore, V1 varies with the thermostat signal 36 between selected maximum ranges. The scaled temperature signal 50 is a fixed fraction of V1 determined by the voltage divider made up of resistors R6 and R7. As explained earlier, the control circuit 40 establishes the velocity through the air conditioning duct 22 as a function of the room temperature. By setting maximum and minimum limits on the scaled temperature signal 50, maximum and minimum limits on flow velocity are thereby automatically set. It will be apparent that it would be possible to set the limits by controlling the maximum and minimum scaled velocity voltages 46. Other methods of setting the maximum and minimum damper 26 positions may become apparent to those skilled in the art.

Figure 4:
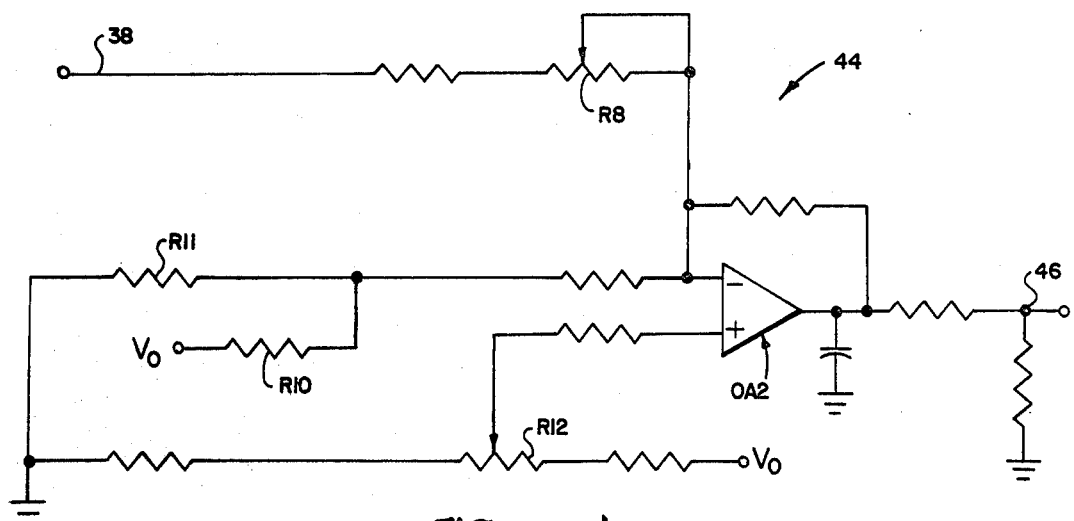
FIG. 4 is a schematic diagram for a velocity scaling circuit.

Referring to FIG. 4, a preferred embodiment of a velocity scaling circuit 44 is shown. The velocity signal 38 is coupled to the negative input of an OP AMP OA2 through a resistive voltage divider network which includes variable resistor R8. The velocity signal 38 is added to a constant voltage defined by two resistors R10 and R11 before coupling to the negative input OA2. A voltage input to the positive input of the OP AMP OA2 can be calibrated through the use of a variable resistor R12.

Since the velocity sensor voltage 38 increases with increasing air velocity and vice versa, and is coupled to the negative input of the OP AMP OA2, the scaled velocity output voltage 46 decreases with increasing air velocity. The adjustable inputs to the OP AMP OA2 set the gain and DC offset so that the scaled velocity voltage 46 varies over the same range as the scaled temperature voltage 50. Therefore, these values can now be directly compared.

Figure 5:
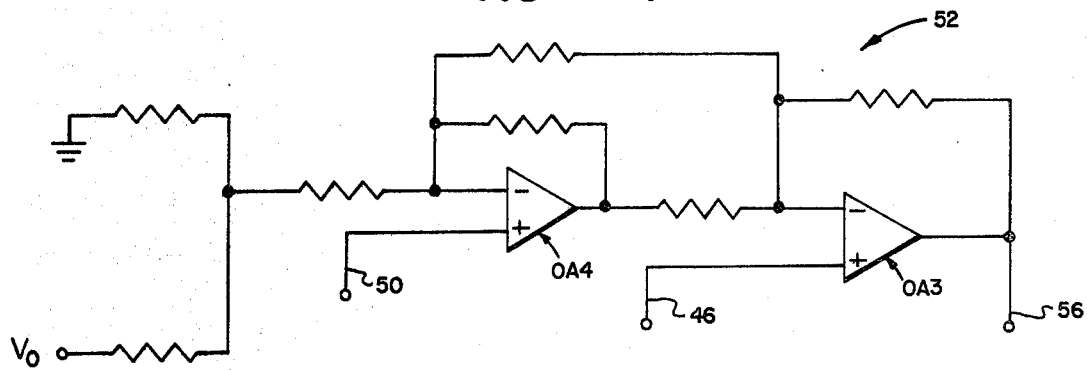
FIG. 5 is a schematic diagram for a velocity minus temperature subtractor.

FIG. 5 shows a preferred embodiment for a velocity minus temperature subtractor circuit 52. The scaled velocity voltage 46 is coupled to the positive input of an OP AMP OA3. The scaled temperature voltage 50 is coupled to the negative input of OP AMP OA3 through an OP AMP OA4. Resistor values are chosen so that the gain of each OP AMP OA3 and OA4 is one, so that the scaled velocity 46 and temperature 50 voltages are directly compared. The overall gain of 52 is greater than unity.

Figure 6:
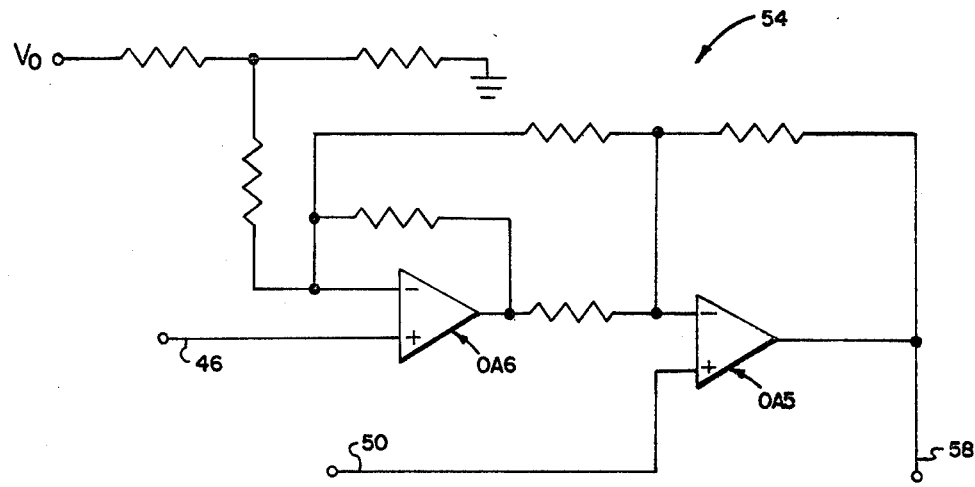
FIG. 6 is a schematic diagram for a temperature minus velocity subtractor.

Referring to FIG. 6, a preferred circuit for the temperature minus velocity subtractor 54 is shown. The second subtractor 54 is identical to the circuitry of the first subtractor 52 except that the velocity and temperature inputs 46 and 50 have been interchanged. That is, the scaled temperature input 50 is coupled to the positive input of an OP AMP OA5, with the scaled velocity input 46 coupled to the negative input of the OP AMP OA5 through an OP AMP OA6. The resistors are chosen as those in the first subtractor 52 so that the second subtractor output 58 is equal to the difference in magnitudes of the scaled temperature 50 and velocity 46 signal times the overall circuit gain.

It will be apparent that the first and second subtractor outputs 56 and 58 will have the same magnitude by interchanging inputs. The magnitude of each of the subtractor outputs 56, 58 indicates whether the input air velocity should be increased or decreased, the magnitude of the difference indicates the magnitude of this change needed. When the magnitudes of the first and second subtractor outputs 56, 58 are equal, the air velocity into the zone 12 is correct for the present zone temperature.

Figure 7:
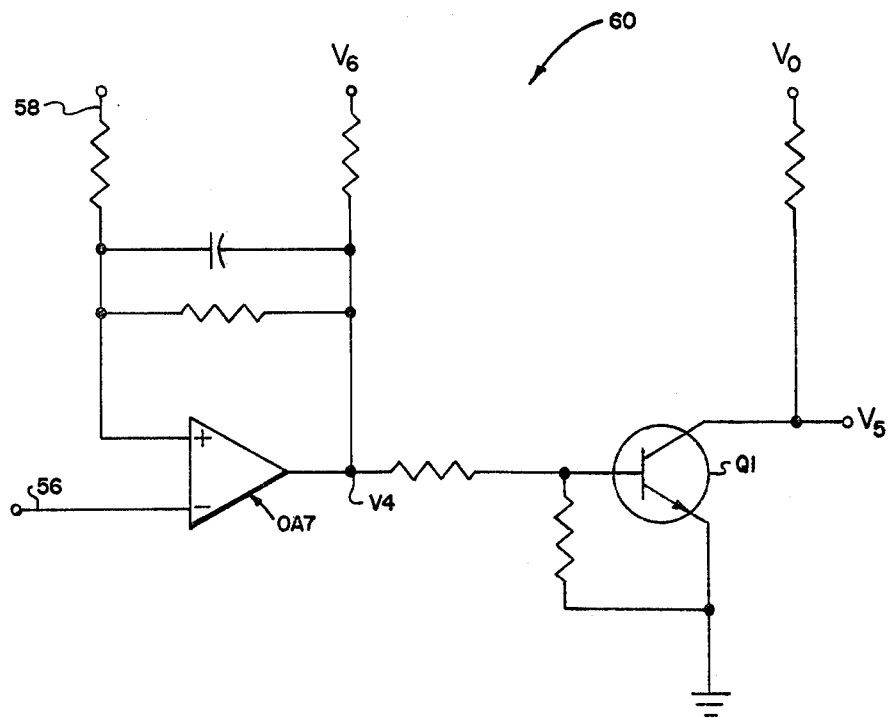
FIG. 7 is a schematic diagram of a positive mode switch.

Referring to FIG. 7, a preferred embodiment of a positive mode switch 60 is shown. The first subtractor output 56 is connected directly to the negative input of an operational amplifier OA7. The second subtractor output 58 is coupled to the positive input of OA7. If the scaled velocity signal 46 is greater than the scaled temperature signal 50, the voltage 56 at the negative input to the OP AMP OA7 will be more positive, then voltage 58 at the positive input. Therefore, the OP AMP OA7 output voltage V4 will be low. This low voltage will not provide the necessary voltage at the base of a switch transistor Q1 to turn it on, so that the transistor Q1 collector voltage V5 will increase toward the power supply voltage V0. If the velocity signal 46 is greater than the temperature signal 48, a first switch output V6 connected to the OP AMP output V4 will be low, and the switch transistor collector voltage V5 will be high.

If the scaled temperature signal 50 is greater than the scaled velocity signal 46, V4 will be high, thereby turning on the output transistor Q1. Thus, the collector voltage V5 will be low. V6 follows V4 and assures positive polarity switching to the motor. V5 is always out of phase with V6 and also assures proper polarity switching to the motor.

Figure 8:
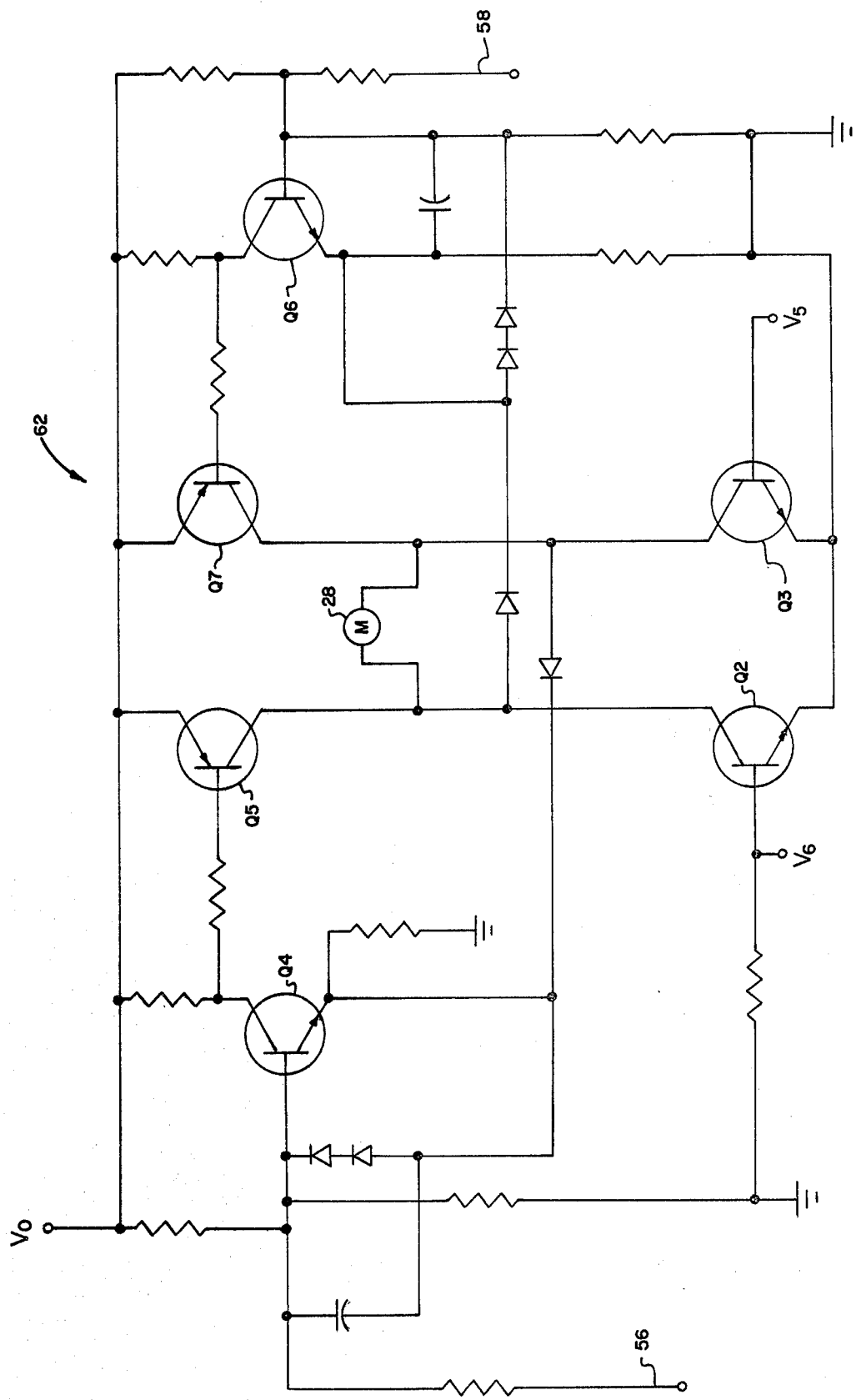
FIG. 8 is a schematic diagram of a damper motor drive control circuit.

Referring to FIG. 8, a preferred embodiment of a motor drive control circuit 62 is shown. The first switch output V6 is connected to the base of a first drive transistor Q2 and the collector output V5 is coupled to the base of a second drive transistor Q3. Since V6 and V5 outputs always have opposite polarity in voltage, one of the drive transistors Q2 or Q3 will be on while the other is off. The first subtractor output 56 is coupled to the base of a third transistor Q4, the collector of which is coupled to the base of a fourth drive transistor Q5. In a symmetrical arrangement, the second subtractor output 58 is coupled to the base of a fifth drive transistor Q6, the collector of which is coupled to the base of a sixth drive transistor Q7.

When the first subtractor output voltage 56 is positive, the drive transistor Q3 will be turned on by the positive mode switch 60. Transistor Q4 will be turned on by the positive first subtractor signal 56, which lowers the voltage at the collector to transistor Q4. This causes transistor Q5 to turn on, thereby conducting current. Transistors Q4 and Q5 do not switch between on and off logical states, but rather conduct current in proportion to the magnitude of the signal received from the first subtractor output 56. Therefore, the current through transistor Q5 varies with the magnitude of the difference between the scaled velocity 46 and temperature 50 signals.

When the scaled velocity signal 46 is greater than the scaled temperature signal 50 the second subtractor output 58 is not able to make Q6 conduct because of low voltage. The collector voltage of Q6 is equal to the supply voltage V0. Drive transistor Q7 therefore does not conduct as there is no voltage drop between the base and emitter of that transistor.

Therefore, when the scaled velocity signal 46 is greater than the scaled temperature signal 50, transistors Q2, Q6 and Q7 are nonconducting. Transistor Q3 conducts in an on state, and transistors Q4 and Q5 conduct a current proportional to the magnitude difference between the scaled temperature 46 and velocity 50 signals. Current conducted by the drive transistor Q5 passes through the variable speed DC motor 28 and to circuit ground through transistor Q3. It will be apparent that when the scaled temperature and velocity voltage 46, 50 magnitudes are substantially equal, one of the differential pair of transistors Q2 or Q3 will still be turned on due to the action of the positive mode switch 60. However, no current is conducted through the electric motor 28, as there will not be a large enough voltage to turn on either transistors Q4 or Q6 and allow current to be conducted through the motor 28.

When the scaled temperature signal 50 is larger than the scaled velocity signal 46, the symmetrical motor drive circuit 62 works as described above by having transistors Q2, Q6 and Q7 conducting while transistors Q3, Q4 and Q5 are nonconducting. Again, the rate of current flow through the electric motor 28 varies with the difference in magnitude between the scaled temperature and velocity signals 46, 50.

It will be apparent that when the system 10 is in the heating mode, and the thermostat voltage 36 increases with increasing temperature, that the control circuit 40 will operate to drive the damper motor 28 in the opposite sense as when operating in the cooling mode. That is, when the room temperature is too high, thus causing an increase in thermostat voltage 36, the control 40 will close the dampers 26. Thus, a simple switch in the polarity of the theromstat signal 36 causes the control 40 to operate in the heating mode.

The thermostat 34 can be any thermostat that generates a varying voltage with temperature variations. The preferred embodiment utilizes a thermostat 34 which generates a decreasing voltage with increasing room temperature.

Any velocity sensor 32 which generates a voltage proportional to air flow may be used. In the preferred embodiment, the velocity sensor voltage 38 increase with increasing air flow. An example of a preferred velocity sensor is shown in a copending U.S. application by the same inventor, entitled AIR FLOW SENSOR, Ser. No. 266,487, filed on May 22, 1981.

Although a preferred embodiment has been described in detail, it should be understood that various substitutions, alterations, and modifications may be apparent to those skilled in the art. These changes may be made without departing from the spirit and scope of the invention as defined by the appended claims.

What is claimed is:

1. In a method for providing a drive control signal to a damper motor for opening and closing a damper in a system for supplying conditioned air to a room through a duct, the improvement comprising:
   comparing an electrical signal proportional to the temperature in the said room with an electrical signal proportional to the velocity of air flow through said duct, and
   driving said damper motor to operate said damper in a direction determined by the greater of said temperature signal or the said velocity signal.

2. The method of claim 1 further comprising the step of:
   driving the damper motor at a rate proportional to the difference in magnitude between the temperature signal and the velocity signal.

3. A method for controlling the air temperature in a zone comprising:
   generating an electrical signal proportional to the zone temperature;
   generating an electrical signal proportional to the velocity of air moving into the zone;
   calculating a first difference signal by subtracting the temperature signal from the velocity signal;
   calculating a second difference signal by subtracting the velocity signal from the temperature signal; and,
   driving a damper motor in a direction determined by a selected one of said difference signals and at a rate proportional to the magnitude of the selected difference signal.

4. An apparatus for providing a control signal for an air conditioning system comprising:
   means for providing a voltage signal proportional to the temperature in a zone;
   means for providing a voltage signal proportional to air velocity in an air conditioning duct;
   a temperature scaling circuit for amplifying the temperature signal;
   comparing means coupled to said scaling circuits for providing at least one output proportional to the difference in magnitudes of the scaled signals; and,
   switch means coupled to said comparing means for providing an output signal which indicates the greater of the scaled temperature signal and the scaled velocity signal and the magnitude of the difference between the scaled signals.

5. The apparatus of claim 4 wherein said comparing means comprises:
   a first subtractor coupled to said temperature and velocity scaling circuits and having an output equal to the scaled temperature signal minus the scaled velocity signal; and,
   a second subtractor coupled to said temperature and velocity scaling circuits and having an output equal to the scaled velocity signal minus the scaled temperature signal.

6. The apparatus of claim 4 further comprising means for driving a damper motor in a direction selected by said switch means and at a rate proportional to the magnitude of the switch means output signal.

7. In a method for providing a control signal to regulate the operation of a system supplying conditioned air to a room through a duct, the improvement comprising:
generating a first electrical signal proportional to the temperature in the said room,
generating a second electrical signal proportional to the velocity of air flow through the said duct,
subtracting the first and second signals from one another to obtain two additional signals with unequal magnitude, and
utilizing one of said two additional signals as the said control signal.

* * * * *